United States Patent [19]

Roos et al.

[11] 4,263,165
[45] Apr. 21, 1981

[54] BLOWING AGENT COMBINATION COMPRISING AZODICARBONAMIDE, ZINC OXIDE AND A BENZENETHIOL SULPHONIC ACID DERIVATIVE

[75] Inventors: Ernst Roos, Odenthal; Werner Jeblick; Helmut Hurnik, both of Leverkusen, all of Fed. Rep. of Germany

[73] Assignee: Bayer Aktiengesellschaft, Fed. Rep. of Germany

[21] Appl. No.: 147,588

[22] Filed: May 7, 1980

[30] Foreign Application Priority Data

May 11, 1979 [DE] Fed. Rep. of Germany ....... 2918964

[51] Int. Cl.³ .............................................. C09K 3/00
[52] U.S. Cl. ............................ 252/350; 224/DIG. 5; 521/89; 521/92; 521/95; 521/134; 521/139; 521/140; 521/143; 521/149; 521/150; 521/180; 521/182
[58] Field of Search ............................ 521/89, 92, 95; 252/350

[56] References Cited

U.S. PATENT DOCUMENTS 3,803,060  4/1974  Roos et al. ............................ 521/909

Primary Examiner—Morton Foelak
Attorney, Agent, or Firm—Connolly and Hutz

[57] ABSTRACT

A blowing agent combination comprising azodicarbonamide, zinc oxide and a benzenethiol sulphonic acid derivative having the general formula (I)

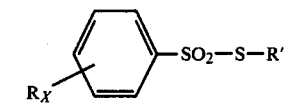

wherein
R is a hydrogen atom, a $C_1$-$C_4$ alkyl radical and/or a chlorine atom,
X is a number from 1 to 5, and
R' is a $C_1$-$C_4$ alkyl radical, a $C_5$-$C_6$ cycloalkyl radical or a $C_7$-$C_8$ arylalkyl radical each of these radicals being optionally substituted by from 1 to 3 $C_1$-$C_4$ alkyl radicals, from 1 to 5 chlorine atoms and/or a carboxylic acid $C_1$-$C_4$ alkyl ester radical, or a radical having one of the general formulae (11a), (11b), (11c) or (11d).

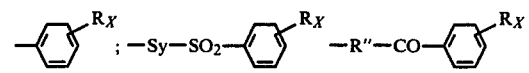

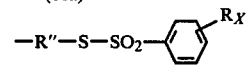

(11d)

in which
y is a number from 0 to 3,
R" is a $C_1$-$C_6$ alkylene radical or a xylylene radical which is optionally substituted by from 1 to 4 methyl radicals and/or from 1-4 chlorine atoms and R and X are as defined above;

may be used as blowing agents.

2 Claims, No Drawings

BLOWING AGENT COMBINATION COMPRISING AZODICARBONAMIDE, ZINC OXIDE AND A BENZENETHIOL SULPHONIC ACID DERIVATIVE

The present invention relates to a blowing agent combination based upon azodicarbonamide, zinc oxide and a benzene thiol sulphonic acid derivative, to the production thereof by mixing the aforementioned components, as well as to the use thereof for the production of cellular and porous articles, more particularly the production of foamed plastics from thermoplastic synthetic materials.

It is known to produce foamed plastics from thermoplastic synthetic materials by working an organic chemical blowing agent into the synthetic material, by tumbling such a blowing agent on a synthetic material granulate or by mixing such a blowing agent homogeneously with a synthetic material powder, which blowing agent decomposes with gas evolution at temperatures where the synthetic material becomes plastic.

Substances belonging to the varied classes of compounds which maybe used for this purpose of application are described in the literature, e.g. azo compounds, hydrazine, semicarbazide, triazole, tetrazole, N-nitroso compounds, benzoxazine, and others(see Kunststoffe 66 (1976) 10, pages, 698–701).

One of the most frequently used organic chemical blowing agents is azodicarbonamide. However, temperatures of 205°–215° C. are necessary for the evolution of the blowing gas, which is a disadvantage in many applications. Accordingly in the past many efforts were made to lower the decomposition temperature of azodicarbonamide. It was possible to reduce the decomposition temperature by adding compounds containing metals, in particular lead, zinc, and/or cadmium compounds. However, it is still a disadvantage that even with the best commercial activator, the rate of decomposition of azodicarbonamide is low at temperatures of below 160° C.

Another deficiency which is observed when using azodicarbonamide as a blowing agent, is that ammonia appears in the decomposition gases and this leads to corrosion of the metal moulds used in the production of the foamed plastics. Furthermore, for example in the injection moulding of thermoplastics containing azodicarbonamide, an interfering mould covering is detected which is attributed to cyanuric acid which results from decomposition.

The formation of cyanuric acid is greatly reduced according to the disclosure of German Offenlegungsschrift No. 23 59 007 by the addition of hydrated silicic acid or dehydrated metal salts, but it is not however, completely suppressed. An aggravating disadvantage however, is that the formation of ammonia is greatly accelerated by the presence of water.

The object of the present invention was to develop a blowing agent combination which allows azodicarbonamide to decompose sufficiently quickly at temperatures of below 160° C. with the production of decomposition gases which are free of ammonia and to prevent any mould covering.

It has now been found the above object can be solved by the blowing agent combinations according to the present invention, these being based on azodicarbonamide, zinc oxide and a benzene thiol sulphonic acid derivative according to general formula (1).

Accordingly, the present invention provides a blowing agent combination comprising azodicarbonamide, zinc oxide and a benzene thiol sulphonic acid derivative according to the general formula (1).

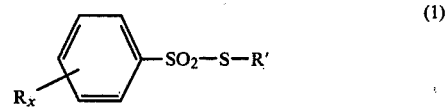

wherein R is a hydrogen atom, a $C_1$–$C_4$ alkyl radical and/or a chlorine atom, X is a number from 1 to 5, and R' is a $C_1$–$C_4$ alkyl radical, a $C_5$–$C_6$ cyclo alkyl radical or a $C_7$–$C_8$ -arylalkyl radical, each of these radicals being optionally substituted by from 1 to 3 $C_1$–$C_4$ alkyl radicals, from 1 to 5 chlorine atoms and/or a carboxylic acid $C_1$–$C_4$ -alkyl ester radical. R' can also be a radical according to one of the general formulae 11a, 11b, 11c or 11d:

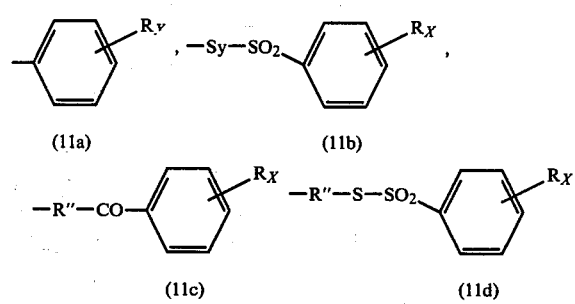

in which
Y is a number from 0 to 3,
R" is a $C_1$–$C_6$ -alkylene radical or a xylylene radical which is optionally substituted by from 1 to 4 methyl radicals and/or from 1 to 4 chlorine atoms and
R and X have the meanings which have already been given for Formula (1) above The above blowing agent combination comprises azodicarbonamide as the blowing agent and an activator combination of zinc oxide and a benzene thiol sulphonic acid derivative of general formula (1) in the respective proportions by weight of from 95:5 to 5:95, preferably 75:25 to 25:75.

The activator mixture itself is composed of from 90 to 10, preferably 70 to 30% by weight of zinc oxide and from 10 to 90, preferably 30 to 70 weight % of the benzene thiol sulphonic acid derivative according to general formula (1).

The following are mentioned as examples of benzenethiolsulphonic acid derivatives:

Benzenethiolsulphonic acid-methylester,
Benzenethiosulphonic acid-carbethoxymethylester,
Benzenethiolsulphonic acid-benzoylmethylester,
Benezenethiolsulphonic acid-ethylester,
Benzenethiolsulphonic acid-n-propylester,
Benzenethiolsulphonic acid-isopropylester,
Benzenethiolsulphonic acid-n-butylester,
Benzenethiolsulphonic acid-iso-butylester,
Benzenethiolsulphonic acid-tert.-butylester,
Benzene thiol sulphonic acid
Benzene thiol sulphonic acid-octylester,
Benzene thiol sulphonic acid-nonylester,
Benzene thiol sulphonic acid-decylester,
Benzene thiol sulphonic acid-dodecylester,
Benzene thiol sulphonic acid-cyclopentylester,
Benzene thiol sulphonic acid-cyclohexylester, -continued Benzene thiol sulphonic acid-benzylester,
Benzene thiol sulphonic acid-4-chlorobenzylester,
Benzenethiolsulphonic acid
Benzenethiolsulphonic acid-4-carbomethyoxy-benzylester,
Benzenethiolsulphonic acid-phenylester,
Benzenethiolsulphonic acid-4-methylphenylester,
Benzenethiolsulphonic acid-pentachlorophenylester,
4-Chlorobenzenethiolsulphonic acid-methylester,
4-Chlorobenzenethiolsulphonic acid-benzoylmethylester,
4-Chlorobenzenethiolsulphonic acid-amylester,
4-Chlorobenzenethiolsulphonic acid-hexylester,
4-Chlorobenzenethiolsulphonic acid-cyclohexylester,
4-Chlorobenzenethiolsulphonic acid-4-carbomethoxy-cyclohexylester,
4-Chlorobenzenethiolsulphonic acid-benzylester,
4-Chlorobenzenethiolsulphonic acid-4-methylbenzylester,
4-Chlorobenzenethiolsulphonic acid-2-phenylethylester,
4-Chlorobenzenethiolsulphonic acid-4-chlorophenylester,
4-Methylbenzenethiolsulphonic acid-methylester,
4-Methylbenzenethiolsulphonic acid-n-butylester,
4-Methylbenzenethiolsulphonic acid-dodecylester,
4-Methylbenzenethiolsulphonic acid-cyclohexylester,
4-Methylbenzenethiolsulphonic acid-2-chlorobenzylester,
4-Methylbenzenethiolsulphonic acid-2-methylphenylester,
Dibenzenesulphonyl-monosulphide,
Dibenzenesulphonyl-disulphide,
Dibenzenesulphonyl-trisulphide,
Dibenzenesulphonyl-tetrasulphide,
Bis-4-methylbenzenesulphonyl-monosulphide,
Bis-4-methylbenzenesulphonyl-disulphide,
Bis-4-methylbenzenesulphonyl-trisulphide,
Bis-4-methylbenzenesulphonyl-tetrasulphide,
Bis-4-chlorobenzenesulphonyl-monosulphide,
Bis-4-chlorobenzenesulphonyl-disulphide,
Bis-4-chlorobenzenesulphonyl-trisulphide,
Bis-4-chlorobenzenesulphonyl-tetrasulphide,
Methylene-bis-benzenethiolsulphonic acid ester,
1,2-Ethylene-bis-benzenethiolsulphonic acid ester,
1,2-Ethylene-bis-4-methylbenzenethiolsulphonic acid ester,
1,2-Ethylene-bis-4-chlorobenzenethiolsulphonic acid ester,
1,4-Tetramethylene-bis-benzenethiolsulphonic acid ester,
1,4-Tetramethylene-bis-4-chlorobenzenethiol sulphonic acid ester,
1,4-Tetramethylene-bis-4-methylbenzenethiolsulphonic acid ester,
1,6-Hexamethylene-bis-benzenethiolsulphonic acid ester,
1,6-Hexamethylene-bis-4-chlorobenzenethiolsulphonic acid ester,
1,6-Hexamethylene-bis-4-methylbenzenethiolsulphonic acid ester,
o-,m- or p-Xylylene-bis-benzenthiolsulphonic acid ester,
o-,m- or p-Xylylene-bis-4-chlorobenzenethiolsulphonic acid ester,
o-,m- or p-Xylylene-bis-4-methylbenzenethiolsulphonic acid ester,
Tetrachlorine-o, m- or p-xylylene-bis-benzenethiolsulphonic acid ester,
Tetramethyl-o, m- or p-xylene-bis -benzenethiolsulphonic acid ester, and
Dimethyl-dichloro-o-, m-, or p-xylylene-bis-benzenethiol sulphonic acid ester.

The production of the benzenethiolsulphonic acid derivatives is known from the literature and can for example result according to the following process of:

(1) The reaction of benzenethiolsulphonic acid salts with alkyl, cycloalkyl, aralkyl, alkylene or xylylene halides (or sulphates, or sulphonesters), e.g.

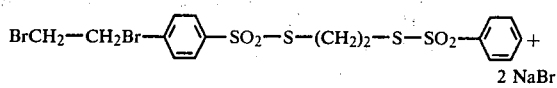

or

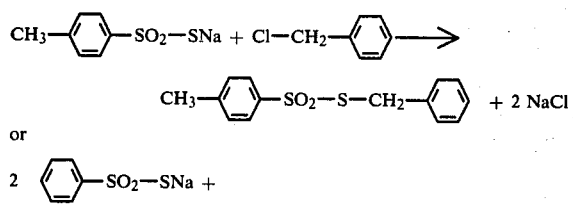

(2) The reaction of benzenethiolsulphonic acid salts with sulphur halides,

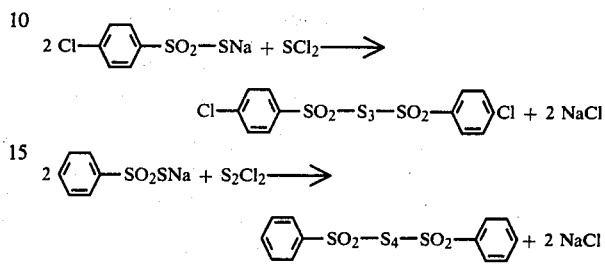

(3) The reaction of benzenesulphinic acid salts with sulphenic acid halides or sulphur halides. e.g.

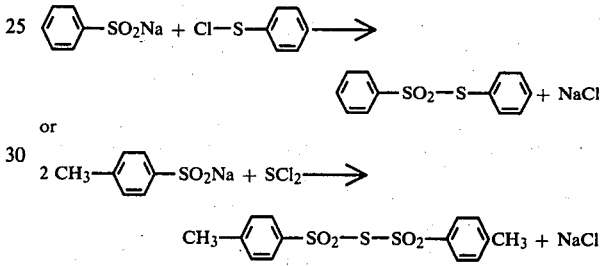

The blowing agent combination according to the present invention is produced by mixing the components thereof in any sequence. Mixing is carried out in a conventional mixing apparatus which is familiar to the skilled man, suitably at temperatures of between 15° and 30° C. In some cases it is advisable to add the zinc oxide and the benzenethiolsulphonic acid derivative to finely ground azodicarbonamide.

With the aid of the blowing agent combinations according to the present invention, cellular and porous articles can be produced, particularly foamed plastics from thermoplastic synthetic materials. The following are mentioned as examples of thermoplastic synthetic materials:

Polyvinylchloride, Polyethylene, Polypropylene, Copolymers of VC/VAC, VC/EVAC, E/VC, Propylene/VC, E/VAC, Polystyrene, Polyethylstyrene, Polyamide, Polycarbonate, Polysulphone, Polyethyleneterephthalate, Polybutyleneterephthalate, Polyphenyleneoxide, Polyacrylonitrile, Polymethacrylonitrile, Polymethacrylate, synthetic materials based on cellulose esters, Acrylonitrile-Butadiene-Styrene-Polymers (ABS), mixtures of Polysulphone and Styrene-Acrylonitrile- or ABS-polymers, mixtures of Polycarbonate and ABS-Polymers and mixtures of PVC and ABS-polymers or Acylonitrile-Polymers.

The blowing agent combination according to the present invention is preferably added in quantities of from 0.1 to 25% by weight, particularly preferably in quantities of from 0.3 to 15% by weight, based on the weight of synthetic material. However, it can also be measured out and added in any other quantity which is familiar to the skilled man, and the addition may be adjusted particularly to the requirements which are set by the skilled man for the article which is to be foamed.

For the production of cellular and porous articles, the blowing agent—synthetic material mixtures are heated to temperatures of preferably from 140° to 350° C., more preferably from 145° to 300° C., at which temperatures decomposition of the blowing agent causes the synthetic material to foam up. The temperature which is used in a particular case depends upon the processing scope of the thermoplastic used.

Examples of cellular and porous articles are: foamed synthetic leather for the padding, leather goods and shoe industries, foamed flooring materials, life-jackets, buoys and floats, foamed housings for the radio and phono industries, furniture and parts of furniture, imitation wood, foamed extrusion articles such as pipes, profiles of all kinds, cable casings, and foamed films for decoration and packing purposes.

The present invention is further illustrated in the following examples.

The gas evolution which is obtained with one of the blowing agent combinations according to the present invention is shown in Table 1. The gas evolution is shown as a function of the ratio ZnO to dibenzenesulphonyl-disulphide at various temperatures.

Example 1 represents the prior art. From Examples 2 to 10, the synergistic effect between ZnO and the activator according to the present invention can be seen.

The gas evolution depending on the activator concentration at various temperatures is shown in Table 2. Examples 18 and 19 represent the prior art.

Table 3 shows the specific weight of PVC-flexible foams with blowing agent combinations of the present invention, (Examples 22 to 37).

Example 40 contains azodicarbonamide without an activator and Examples 39, 41, 42, 43 and 44 represent the prior art.

The PVC-flexible foams were produced on a coating installation which was heated with hot air, the coating weight being 850 g/m², the gel and foam temperature being 190° C., and the duration in the gel passage was varied from two minutes (corresponds to a production rate of 6 m/min) to 1 minute (corresponds to 12 m/min).

Particularly where high production rates are concerned, the advance of the present invention (Examples 22 to 37) can be seen as against the present state of the art (Examples 39, 41, 42, 43 and 44). Comparing Example 39 with example 22:

With a production rate of 6 m/min ($\triangleq$ 2 minutes duration), with ZnO only as activator, a PVC-flexible foam is obtained with a specific gravity of 0.49 g/cm³. The blowing agent combination according to the present invention products the same specific gravity of 0.49 g/cm³ with a production rate of 12 m/min ($\triangleq$ 1 minute duration).

This is correspondingly valid for the other Examples.

TABLE 1

Gas evolution (ml) depending on the ratio ZnO: activator at various temperatures.

| Example No. | Activator (C) | B:C | Blowing agent-activator combination (1) in 15 ml DOP | | |
|---|---|---|---|---|---|
| | | | A | B | C |
| 1 | Dibenzenesulphonyl-disulphide | 10:0 | 1,0 | 1,5 | — |
| 2 | Dibenzenesulphonyl-disulphide | 9:1 | 1,0 | 1,35 | 0,15 |
| 3 | Dibenzenesulphonyl-disulphide | 8:2 | 1,0 | 1,20 | 0,30 |
| 4 | Dibenzenesulphonyl-disulphide | 7:3 | 1,0 | 1,05 | 0,45 |
| 5 | Dibenzenesulphonyl-disulphide | 6:4 | 1,0 | 0,90 | 0,60 |
| 6 | Dibenzenesulphonyl-disulphide | 5:5 | 1,0 | 0,75 | 0,75 |
| 7 | Dibenzenesulphonyl-disulphide | 4:6 | 1,0 | 0,60 | 0,90 |
| 8 | Dibenzenesulphonyl-disulphide | 3:7 | 1,0 | 0,45 | 1,05 |
| 9 | Dibenzenesulphonyl-disulphide | 2:8 | 1,0 | 0,30 | 1,20 |
| 10 | Dibenzenesulphonyl-disulphide | 1:9 | 1,0 | 0,15 | 1,35 |
| 11 | Dibenzenesulphonyl-disulphide | 0:10 | 1,0 | — | 1,5 |

| Example No. | Amount of evolved gas (2) (ml) at °C. | | | |
|---|---|---|---|---|
| | 145 | 150 | 155 | 160 |
| 1 | 8 | 13 | 22 | 62 |
| 2 | 32 | 152 | 167 | 178 |
| 3 | 46 | 147 | 168 | 183 |
| 4 | 191 | 209 | 219 | 230 |
| 5 | 192 | 212 | 224 | 233 |
| 6 | 224 | 230 | 238 | 243 |
| 7 | 226 | 232 | 238 | 245 |
| 8 | 228 | 235 | 239 | 242 |
| 9 | 163 | 170 | 178 | 186 |
| 10 | 47 | 143 | 150 | 157 |
| 11 | 0 | 0 | 0 | 0 |

(1) A = (g) Azodicarbonamide with average particle size of 5 μm
B = (g) ZnO
C = (g) activator
(2) Volumetic measurement of the amount of gas evolved in ml A/B/C dispersed in 15 ml Di-2 ethylhexylphthalate (DOP) and heated in a 50 ml small glass flask at approx. 2° C./minute (rate of heating).

TABLE 2

Gas evolution (ml) depending on the activator at various concentration temperatures.

| Example No. | Activator (C) | Blowing agent activator combination[1] in 15ml DOP | | | |
|---|---|---|---|---|---|
| | | A | B | C | B:C |
| 12 | Dibenzenesulphenyl-disulphide | 1,0 | 0,125 | 0,125 | 1:1 |
| 13 | Dibenzenesulphenyl-disulphide | 1,0 | 0,25 | 0,25 | 1:1 |
| 14 | Dibenzenesulphenyl-disulphide | 1,0 | 0,50 | 0,50 | 1:1 |
| 15 | Dibenzenesulphenyl-disulphide | 1,0 | 0,75 | 0,75 | 1:1 |
| 16 | Dibenzenesulphenyl-disulphide | 1,0 | 1,00 | 1,00 | 1:1 |
| 17 | Dibenzenesulphenyl-disulphide | 1,0 | 1,50 | 1,50 | 1:1 |
| 18 | — | 1,0 | 0,75 | — | |
| 19 | — | 1,0 | 1,50 | — | |
| 20 | Dibenzenesulphenyl-disulphide | 1,0 | — | 0,75 | |
| 21 | Dibenzenesulphenyl-disulphide | 1,0 | — | 1,50 | |

TABLE 2-continued

Gas evolution (ml) depending on the activator at various concentration temperatures.

| Example No. | Amount of gas evolved (2) (ml) at °C.: | | | |
|---|---|---|---|---|
| | 145 | 150 | 155 | 160 |
| 12 | 38 | 155 | 174 | 178 |
| 13 | 132 | 189 | 190 | 193 |
| 14 | 208 | 211 | 214 | 216 |
| 15 | 224 | 230 | 238 | 243 |
| 16 | 233 | 243 | 256 | 271 |
| 17 | 200 | 232 | 266 | 275 |
| 18 | 0 | 0 | 0 | 7 |
| 19 | 8 | 13 | 22 | 62 |
| 20 | 0 | 0 | 0 | 0 |
| 21 | 0 | 0 | 0 | 0 |

TABLE 3

Specific weight (g/cm$^3$) of PVC-flexible-foams depending on the blowing agent-activator combination and differing gels times at 190° C., coating weight ca. 850 g/m$^2$

| Example No. | Activator (C)[6] | Blowing agent-activator combination | | |
|---|---|---|---|---|
| | | A[1] | B | C |
| 22 | No. 1 | 1,0 | 0,75 | 0,75 |
| 23 | No. 2 | 1,0 | 0,75 | 0,75 |
| 24 | No. 3 | 1,0 | 0,75 | 0,75 |
| 25 | No. 4 | 1,0 | 0,75 | 0,75 |
| 26 | No. 5 | 1,0 | 0,75 | 0,75 |
| 27 | No. 6 | 1,0 | 0,75 | 0,75 |
| 28 | No. 7 | 1,0 | 0,75 | 0,75 |
| 29 | No. 8 | 1,0 | 0,75 | 0,75 |
| 30 | No. 9 | 1,0 | 0,75 | 0,75 |
| 31 | No. 10 | 1,0 | 0,75 | 0,75 |
| 32 | No. 11 | 1,0 | 0,75 | 0,75 |
| 33 | No. 12 | 1,0 | 0,75 | 0,75 |
| 34 | No. 13 | 1,0 | 0,75 | 0,75 |
| 35 | No. 14 | 1,0 | 0,75 | 0,75 |
| 36 | No. 15 | 1,0 | 0,75 | 0,75 |
| 37 | No. 16 | 1,0 | 0,75 | 0,75 |
| 38 | No. 1 | 1,0 | — | 1,5 |
| 39 | — | 1,0 | 1,5 | — |
| 40 | — | 1,0 | — | — |
| 41 | Naftovin T80[3] | 1,0 | — | 1,5 |
| 42 | Naftovin T80 | 1,0 | 0,75 | 0,75 |
| 43 | Sicostab M64[4] | 1,0 | — | 1,5 |
| 44 | Sicostab M64 | 1,0 | 0,75 | 0,75 |
| 45 | ZnS | 1,0 | — | 1,5 |

| Example No. | specific weight (g/cm$^3$) at 190° C. and at the minute of gel time | | | |
|---|---|---|---|---|
| | 2,0 | 1,5 | 1,2 | 1,0 |
| 22 | 0,30 | 0,33 | 0,39 | 0,49 |
| 23 | 0,30 | 0,34 | 0,40 | 0,51 |
| 24 | 0,30 | 0,31 | 0,37 | 0,48 |
| 25 | 0,30 | 0,34 | 0,43 | 0,56 |
| 26 | 0,30 | 0,33 | 0,40 | 0,51 |
| 27 | 0,30 | 0,33 | 0,40 | 0,53 |
| 28 | 0,30 | 0,34 | 0,41 | 0,53 |
| 29 | 0,30 | 0,33 | 0,39 | 0,51 |
| 30 | 0,32 | 0,36 | 0,42 | 0,56 |
| 31 | 0,29 | 0,32 | 0,38 | 0,50 |
| 32 | 0,30 | 0,33 | 0,38 | 0,49 |
| 33 | 0,32 | 0,34 | 0,42 | 0,52 |
| 34 | 0,35 | 0,39 | 0,47 | 0,61 |
| 35 | 0,30 | 0,32 | 0,38 | 0,49 |
| 36 | 0,31 | 0,33 | 0,39 | 0,49 |
| 37 | 0,30 | 0,32 | 0,38 | 0,48 |
| 38 | 0,54 | 0,62 | 0,68 | 0,74 |
| 39 | 0,49 | 0,59 | 0,73 | 0,92 |
| 40 | 0,59 | 0,68 | 0,82 | 0,94 |
| 41 | 0,48 | 0,60 | 0,73 | 0,88 |
| 42 | 0,34 | 0,53 | 0,69 | 0,85 |
| 43 | 0,41 | 0,45 | 0,55 | 0,64 |
| 44 | 0,41 | 0,44 | 0,59 | 0,72 |

TABLE 3-continued

Specific weight (g/cm$^3$) of PVC-flexible-foams depending on the blowing agent-activator combination and differing gels times at 190° C., coating weight ca. 850 g/m$^2$

| 45 | 0,57 | 0,68 | 0,80 | 0,90 |
|---|---|---|---|---|

[1] A = (g) Azodicarbonamide (5μ) /B = (g) ZnO/C(g) activator
[2] PVC-Foampaste:50,0 g PVC (Vestolit E7012)/37,5 g DOP 12,5 g BBP. /1,5 g Irgastab 17 MoL[5] X g Blowing agent activator-combinationA/B/C
[3] Naftovin T80 = dibas. Leadphthalate, Producer: MetallgesellschaftFrankfurt/M.
[4] Sicostab M64-Cd/Zn-Complex. Producer: Siegling/Stuttgart
[5] Irgastab 17 Mol = Di-n-octyltin-bis-thioglycolacidi sooctyl = ester/glycerinemono fatty acid ester75/25 Producer: Ciba-Geigy/Basel
[6] The stated activators (C) are to be taken from the followingTable 4:

TABLE 4

| Activator | No | | |
|---|---|---|---|
| Activator | No | 1 | =Dibenzenesulphonyl-disulphide |
| " | " | 2 | =Dibenzenesulphonyl-monosulphide |
| " | " | 3 | =Bis-4-chlorobenzene-sulphonyl-disulphide |
| " | " | 4 | =Bis-4-methylbenzene-sulphonyl-disulphide |
| " | " | 5 | =Dibenzenesulphonyl-tetrasulphide |
| " | " | 6 | =1,2 Ethylene-bis-4-methylbenzenethiol-sulphonic acid ester |
| " | " | 7 | =4-Methylbenzenethiol-sulphonic acid-methylester |
| " | " | 8 | =Benzenethiolsulphonic acid-methylester |
| " | " | 9 | =Benzenethiolsulphonic-acid-carbethoxymethyl-ester |
| " | " | 10 | =Benzenethiolsulphonic-acid-ethylester |
| " | " | 11 | =Benzenethiolsulphonic-acid-benzylester |
| " | " | 12 | =Benzenethiolsulphonic-acid-4-carbomethyoxy-benzylester |
| " | " | 13 | =-Benzenethiolsulphonic-acid-benzoymethylester |
| " | " | 14 | =o-xylylene-bis-benzene-thiolsulphonic acid ester |
| " | " | 15 | =Tetrachlorine-m-xylylene-bis-benzenethiolsulphonic acid ester |
| " | " | 16 | =p-xylylene-bis-benzene-thiolsulphonic acid ester |

EXAMPLE 46

A PVC-plastisol consisting of:
50 parts by weight of PVC-pastes K-value 70 (pH of the aqueous extract=7.0)
50 parts by weight of DOP
0.5 parts by weight of diphenylthiourea
10 parts by weight of azodicarbonamide (average particle size 5.0 nm)
6 parts by weight of dibenzenesulphonyl-disulphide
9 parts by weight of ZnO
is introduced into a gas tight steel mould of size 100×100×10 mm and is pressed under a high pressure press at 25 bar and 170° C. for 20 minutes. After cooling, the moulded article is re-heated at 100° C. for 30 minutes with hot air. A fine porous foam having a bulk density of 52 kg/m$^3$ is obtained.

EXAMPLE 47

1000 g of ABS polymer is mixed with 1.5 g of paraffin oil for 10 minutes in a tumbler mixer. After this mixing time, 2.5 g of azodicarbonamide, 1.25 g of ZnO and 1.25 g of dibenzenesulphonyl-monosulphide are added and distributed in homogeneous fashion by further mixing on the ABS-surface. The mixture thus produced is then foamed in a spiral injection moulding machine having a needle shut-off nozzle, into 9 mm thick moulded shapes, at a mass temperature of 220° C. A fine porous foam having a regular foam structure and a density of 0.65 g/cm³ is obtained.

The injection mould form was free from mould covering, and the formation of ammonia was not observed.

EXAMPLE 48

A plastisol consisting of:

55 parts by weight of PVC/PVAc, (PVAc-content 5%)
45 parts by weight of an alkane sulphonic acid ester of phenol (trade name: Mesamoll/Bayer AG),
1.5 parts by weight of Di-n-octyltin-bis-thioglycol acid octylester,
1.0 parts by weight of azodicarbonamide,
0.60 parts by weight of ZnO and
0.90 parts by weight of dibenzenesulphonyl-monosulphide is foamed at 160° C. (hot air temperature) for 6 minutes with a coating weight of 850 g/m². A fine porous foam having a specific gravity of 0.40 g/cm³, is obtained.

In comparison, the plastisol of Example 48 but having 1.0 parts /5-morpholyl-1,2,3,4-thiatriazole and 0.75 parts ZnO under the same conditions as above yields a foam having a specific gravity of 0.47 g/cm³.

5-morpholyl-1,2,3,4-thiatriazole was chosen and compared as a commercial blowing agent having a low decomposition temperature.

We claim:

1. A blowing agent combination comprising azodicarbonamide, zinc oxide and a benzenethiol sulphonic acid derivative of the formula

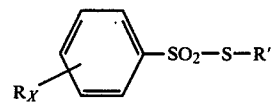

wherein R is at least one member selected from the group consisting of hydrogen, $C_1$-$C_4$ alkyl and chlorine; X is a number from 1 to 5 and R' is (a) $C_1$-$C_4$ alkyl, (b) $C_5$-$C_6$ cycloalkyl, (c) $C_7$-$C_8$ aralkyl, (d) one of (a), (b) or (c) substituted by from 1 to 3 $C_1$-$C_4$ alkyl moieties, (e) one of (a), (b) or (c) substituted with from 1 to 5 chlorine atoms, (f) one of (a), (b) or (c) substituted by a carboxylic acid—$C_1$-$C_4$ alkyl ester radical,

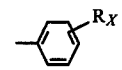

(g)

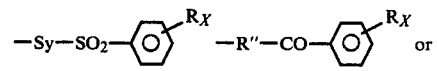

(h)     (i)

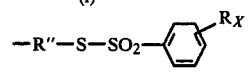

(j)

wherein y is a number from 0 to 3 and R" is $C_1$-$C_6$ alkylene, xylylene or xylylene substituted by 1 to 4 members selected from the group consisting of methyl and chlorine, said blowing agent combination containing from 95 to 5 parts by weight of azodicarbonamide and from 5 to 95 parts by weight of a mixture containing 90 to 10% by weight of zinc oxide and from 10 to 90% by weight of said benzenethiol sulfonic acid derivative.

2. The blowing agent combination of claim 1 wherein said benzenethiol sulphonic acid derivative is dibenzenesulphonyl-disulphide.

* * * * *